United States Patent [19]

Satake et al.

[11] Patent Number: 5,068,559
[45] Date of Patent: Nov. 26, 1991

[54] INDUCTION MOTOR SWITCHABLE BETWEEN SERIES DELTA AND PARALLEL WYE

[75] Inventors: Toshihiko Satake, Higashihiroshima; Yukio Onogi, Hiroshima, both of Japan

[73] Assignee: Satake Engineering Co., Ltd., Tokyo, Japan

[21] Appl. No.: 588,921

[22] Filed: Sep. 27, 1990

[30] Foreign Application Priority Data

Oct. 5, 1989 [JP] Japan .................................. 1-261446

[51] Int. Cl.⁵ .......................... H02P 1/32; H02P 5/28; H02P 8/00; H02P 13/06
[52] U.S. Cl. ................................. 310/112; 310/68 R; 318/771
[58] Field of Search ...................... 310/68 R, 116, 166, 310/200, 208; 318/770, 771

[56] References Cited

U.S. PATENT DOCUMENTS 2,182,646 12/1939 Shutt ..................................... 318/771
4,446,415 5/1984 Taylor et al. ........................ 318/771

FOREIGN PATENT DOCUMENTS 969970 7/1949 Fed. Rep. of Germany ...... 318/771
543530 9/1922 France ................................. 318/771
562041 6/1944 United Kingdom ................ 318/771

*Primary Examiner*—Steven L. Stephan
*Assistant Examiner*—D. L. Rebsch
*Attorney, Agent, or Firm*—Fish & Richardson

[57] ABSTRACT

An induction motor, including a single rotor formed in one-piece and first and second stators disposed side by side, has a phase changing device for varying the phase difference between the rotational magnetic field generated by the first stator and that generated by the second stator. The phase changing device comprises at least first and second short-circuiting switches for short-circuiting or disconnecting the series-junction nodes of the stator windings. The first switching produces a configuration intermediate to series delta and parallel Y (Wye), and the second completes the transformation from delta to Y. The motor presents three different torque curves suitable for starting operation, intermediate speed operation and normal or steady-state operation by the switching operation of the first- and second-switches.

10 Claims, 7 Drawing Sheets

INDUCTION MOTOR SWITCHABLE BETWEEN SERIES DELTA AND PARALLEL WYE

BACKGROUND OF THE INVENTION

The present invention relates to an induction motor having a single one-piece rotor and a plurality of stators which can start smoothly and output a high driving torque in a wide range from a low speed range to a high speed range and, more particularly, to a phase changing system for the motor which effects a phase shifting operation in the rotating magnetic fields around the rotor conductive members of the rotor, generated by the stators surrounding the rotor.

As for the methods for controlling the torque and speed in an induction motor of the type having a plurality of stators, a conventional method available is to cause phase differences between the stators. A mechanical system for effecting such phase differences may have an arrangement wherein the relative rotation of stators is relied upon to produce a phase difference and, an electrical system therefor may have an arrangement wherein the connections of stator windings are changed to produce several kinds of phase differences. Other available systems include one wherein Y-Δ-connection changing system is combined.

Any appropriate method is selected in a number of different ways from among the above methods or systems according to the load characteristics of load connected to the motor or the use of the motor, such as the need to meet the load by changing the torque or the speed of the motor and the need to make a smooth increase in the speed at the starting of the motor.

The present invention provides an arrangement in which certain stepwise phase differences are provided to meet the load connected and which may be regarded as falling within the electrical systems for effecting phase changes as referred to above in the explanation of the conventional methods.

In the conventional electrical systems explained above, the phase changing is effected by the connection-changing of the stator windings, so that, while the phase differences available can be of 0°, 60°, 120°, 180° in the electrical angles, the number of the switches required will exceed a dozen or more. This is one of the reasons for the high manufacturing cost of such system.

There is also an ordinary induction motor in which a Y-Δ-connection changing system is provided for the purpose of improving the starting characteristics of the motor. In such a motor, despite the provision of only one stator, its wirings are quite complicated. Also, there occurs a torque change caused by a temporary interruption of the load current at the time when Y to Δ connection changing takes place, and further, there occurs an unavoidable shock caused by a sudden increase in the load current and by a sudden change in the generated torque immediately after the above connection changing. The torque-speed and current-speed characteristic curves obtained according to the conventional Y-Δ connection changing are shown in FIG. 14.

SUMMARY OF THE INVENTION

The present invention, therefore, aims at providing a phase changing system in which, while the torque characteristics based on the phase differences as obtained by the conventional methods are retained, only a minimum number of switches is required for the switching operation, resulting in a considerable reduction of the cost of manufacturing. By the use of the phase changing system of the invention, there occurs no interruption of the load current at the time of operation of the switches concerned and there occurs only a small torque change and an increase in the load current.

According to the present invention, there is provided an induction motor comprising:

a single rotor formed in one-piece having a first and a second rotor core axially mounted on a common axis with an airspace or a non-magnetic portion being provided between the two rotor cores and having on the two rotor cores a plurality of rotor conductive members extending therethrough;

a first and a second stator disposed side by side and surroundingly facing the respective rotor cores, the first and second stators having a first and a second stator core on which a plurality of windings of polyphase are wound, the plurality of polyphase windings of the first and second stators being interconnected so as to form a series Δ-connection; and a phase changing means having short-circuiting switches disposed respectively between series-junction nodes of the respective stator windings of different phases of the first and second stators, for varying the phase difference between the rotational magnetic fields around the first rotor core generated by the first stator and the rotational magnetic fields around the second rotor core generated by the second stator by the operation of the short-circuiting switches.

The connection of the stator windings, at the starting, of the motor according to the present invention is arranged to be a series Δ-connection or a parallel Y-connection each of which provides a predetermined electrical phase difference by way of wiring connections of the stator windings. The phase differences thus obtained may be either one of 180°, 120° and 60°. In the stator windings having such wiring connections, there are provided short-circuiting switches for effecting short-circuiting between the respective connection nodes at which the stator windings are serially connected. For example, such switches may consist of a first short-circuiting switch for short-circuiting certain series connection nodes and a second short-circuiting switch for short-circuiting certain other connection nodes. Since the first short-circuiting switch is so arranged as to short-circuit only part of the series connection nodes upon the closing of the switch, the stator windings are caused to be unbalanced once. When the second short-circuiting switch is also closed, the connection of the stator windings again changes to a balanced connection.

Thus, in the state in which the connection of the stator windings at starting of the motor is a series Δ-connection for causing a predetermined phase difference (either one of 180°, 120° and 60°), the connection changes to an unbalanced connection as the first switch is closed and changes to a parallel Y-connection, the phase difference of which is different from that of the series Δ-connection, as the second switch is also closed. In this instance, when the series Δ-connection having an electrical phase difference (of 180°, 120° or 60°) is directly changed as it is to the parallel Y-connection, the phase difference is also simultaneously changed. Specifically, when the series Δ-connection is changed directly to the parallel Y-connection, the respective phase differences are changed to 180°→120°, 120°→60°, and 60°→0°.

The operations of the induction motor of the invention may be summarized as follows: First, upon the switching-on of the power switch, the motor starts under the serial Δ-connection where the above-mentioned predetermined phase difference is produced between the stators. The load connected to the motor is then accelerated along the torque characteristic curve of the predetermined phase difference. Next, after the lapse of a predetermined time or after the rotational speed reaches a predetermined number, the first-switch is switched on or closed while the second-switch is being retained at its opened state, thereby rendering the unbalanced state. In the unbalanced state, the voltage across the windings increases and the torque increases accordingly. Thus, the load is further accelerated along the torque characteristic curve based on the unbalanced windings and the rotational speed of the motor increases. Lastly, upon the lapse of the predetermined time period after the switching-on of the first-switch or upon the reaching of the rotational speed to the predetermined number, the closing or switching-on of the second-switch renders the connection of the stator windings the parallel Y-connection where the phase difference is smaller by 60° than that produced by the series Δ-connection at starting and the load is driven in accordance with the torque characteristic curve of this parallel Y-connection.

On the other hand, the connection of the stator windings at the starting may well be of a parallel Y-connection which produces a predetermined phase difference (either one of 180°, 120° and 60°). In this case, the connection of the stator windings is changed to an unbalanced state by the opening or switching-off of the first-switch and is further changed to a series Δ-connection, the phase difference of which is different from that of the parallel Y-connection at starting, by the opening of the second-switch in addition to the above first-switch. In this instance, when the parallel Y-connection having an electrical phase difference (of 180°, 120° or 60°) is directly changed to the series Δ-connection, the phase difference is also simultaneously changed. Specifically, when the parallel Y-connection is changed directly to the series Δ-connection, the respective phase differences are changed to 180°→120°, 120°→60°, and 60°→0°.

The operation of the induction motor which starts with the parallel Y-connection may be summarized as follows: First, upon the switching-on of the power switch, the motor starts under the parallel Y-connection where the above-mentioned predetermined phase difference is produced between the stators. The applied load is then accelerated along the torque characteristic curve of the predetermined phase difference. Next, after the lapse of a predetermined time or after rotational speed reaches a predetermined number, the first-switch is switched-off or opened while the second-switch is being retained at its closed state, thereby rendering the connection of the stator windings into the unbalanced state. The voltage across the windings, which are a part of the windings having been unbalanced, goes up and the torque increases accordingly. Thus, the load is further accelerated along the torque characteristic curve based on the unbalanced windings, and the rotational speed of the motor increases. Lastly, upon the lapse of the predetermined time period after the switching-off of the first-switch or upon the reaching of the rotational speed to the predetermined number, the opening or switching-off of the second-switch renders the connection of the stator windings the series-connection where the phase difference is smaller by 60° than that produced by the parallel Y-connection at starting and the load is driven in accordance with the torque characteristic curve of this series Δ-connection.

As explained above, it is possible to change the phase differences in three steps only by the switching operations of the two switches, namely, the first- and the second-short-circuiting switch, and to provide a phase changing system in which the number of the connection-switches required for effecting the necessary switching operation is considerably smaller than that required in a conventional system. Also, as already explained hereinbefore, since at least either one of the two switches is always in its on-state or off-state after starting under the series Δ-connection or the parallel Y-connection, the capacities of the contacts of the first- and second-switches can be made small. Furthermore, since the two switches are adapted to short-circuit or disconnect the series connection nodes of the stator windings, there is no possibility of the load current being interrupted during the operation and, therefore, no possibility of the driving torque becoming zero either. Also, even in case any switching faults due to the on-state of one or both of the switches are caused, for example, by the fusing together of connection contacts of the switches, there is no possibility of such faults developing into any electrical trouble because of the presence of the state in which both the first-switch and the second-switch are simultaneously in their on-states.

In the induction motor according to the present invention, the number of wirings necessary to complete the connection of a power supply source and the connection of the phase changing system comprising the first and second short-circuiting switches is three lines for the power supply source and four for the phase changing system, totaling to seven lines for the specification of a three-phase motor. Where the phase changing system is provided at the side of the power supply source, the number of wirings necessary is six lines from the motor side and three lines from the power supply source side, which presents some difficulties in the setting or installation of this induction motor at a job site. However, by the consolidation of the phase changing system and the motor and the application of the fixed wirings thereto, it becomes sufficient that only three wiring lines be used at the power supply source side and this facilitates the installation of the induction motor at any job site. In an ordinary motor of a large size, the six lines required for effecting the Y-Δ starting render the wiring work complicated. However, in the induction motor according to the present invention, the phase changing system and the induction motor are formed as a unit so that the number of wirings necessary for the operation is only three lines for the power supply source. Thus, even for a large size motor, it is only necessary to confirm, at a job site, the wiring to the three power source lines and the direction of rotation of the motor in the same manner as is the case with a small size motor.

BRIEF DESCRIPTION OF THE DRAWINGS

The above and other objects, features and advantages of the present invention will be apparent from the following description of preferred embodiments of the invention, with reference to the accompanying drawings, in which.

PREFERRED EMBODIMENTS OF THE INVENTION

The present invention is herein explained mainly in relation to a phase changing device for an induction motor having a squirrel-cage type rotor and two stators but it is to be understood that the invention is not limited thereto. It is possible for the invention to be embodied in an induction motor of a wound-rotor type, or be combined with the switching of Y-Δ connections of the stator windings in order to achieve the diversification of torque characteristics. Between the rotor cores, there may be an airspace, a non-magnetic core or a magnetic core.

The applicant in the present patent application has already disclosed in detail in U.S. Pat. No. 4,785,213, issued on Nov. 15, 1988, entitled "Variable Speed Controllable Induction Motor" the construction and the function of an induction motor having a single rotor and a plurality of stators.

Figure 1:
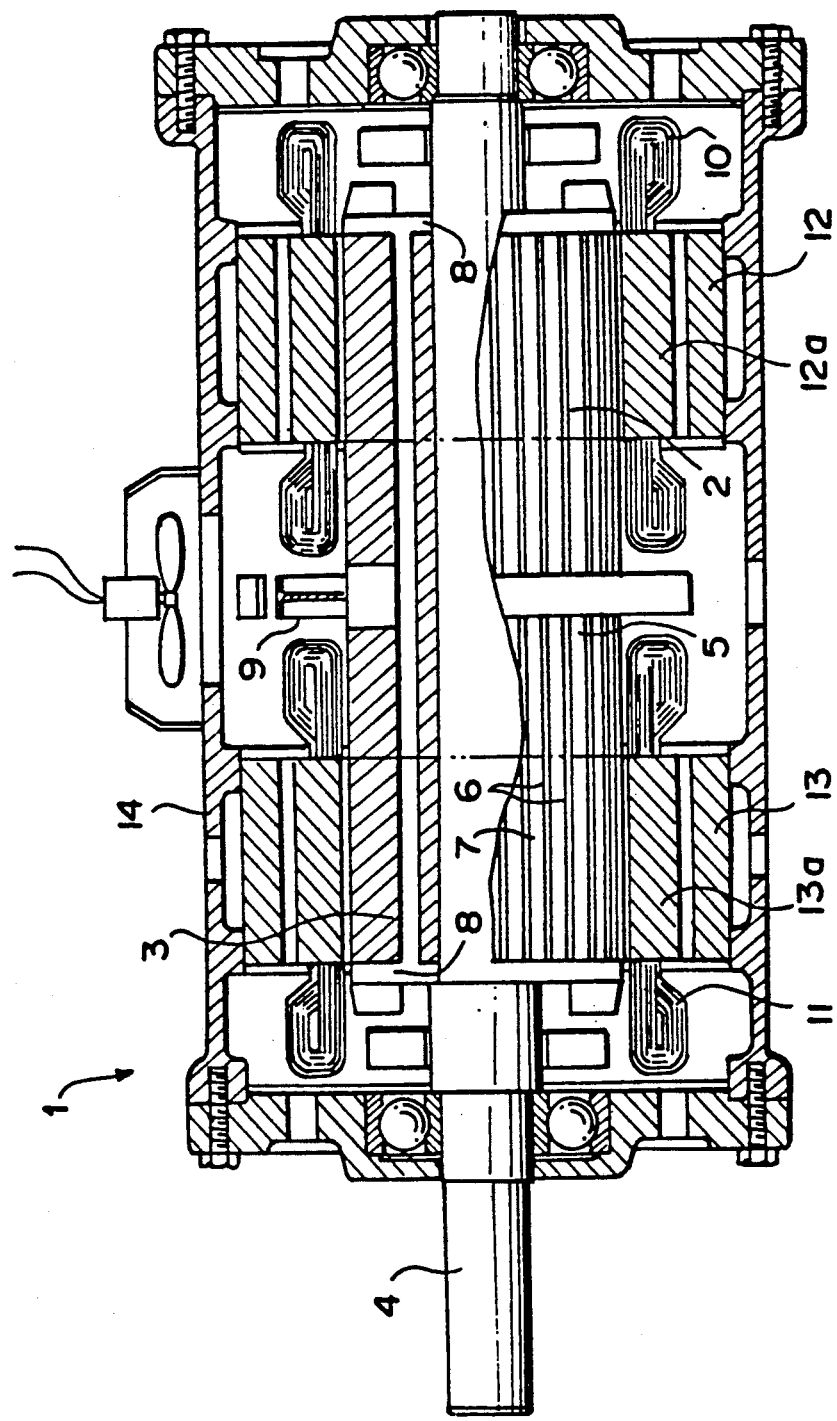
FIG. 1 is a sectional view, partly broken away, of the induction motor according to the present invention.

FIG. 1 illustrates a part of the induction motor which is an embodiment of the present invention. The numeral 1 represents the induction motor with a plurality of stators, the motor generally having arrangements as follows: Rotor cores 2, 3 of magnetic material are mounted on a rotor shaft 4 with a predetermined space being provided therebetween. Between the rotor cores 2 and 3, there may be provided either a non-magnetic core 5 or an airspace. Respective rotor conductive members 6 mounted on the rotor cores 2, 3 are connected so as to extend through them, thereby forming a unitary rotor 7, and both ends of the conductive members 6 are short-circuited by short-circuit rings 8, 8. Also, in this configuration, the rotor conductive members 6 mounted on the rotor 7 are short-circuited, at the non-magnetic core portion 5 between the rotor cores 2, 3, by resistive members 9. The resistive members 9 allow the flow of current when there exist predetermined vector differences in the currents flowing in the conductive members 6. All the conductive members 6 mounted on the rotor 7 are not necessarily short-circuited by the resistive members 9 . . . and only some of them may be short-circuited, depending on the load characteristics of the load connected.

First and second stators 12, 13 having stator windings 10, 11 provided on stator cores 12a, 13a are disposed side by side surroundingly facing the rotors 2 and 3, respectively. The first and second stators 12, 13 are fixedly mounted on a machine frame 14. The stator windings 10, 11 are so connected with each other as to form a series Δ-connection which produces the phase difference of, for example, 60° in the electrical angle.

Next, the embodiment of the present invention is explained with reference to FIG. 2 et seq.

Figure 2:
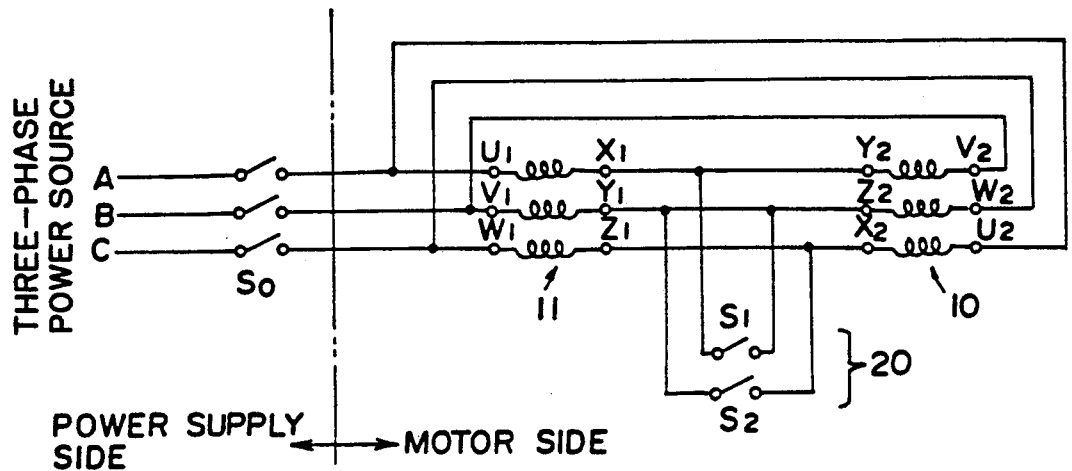
FIG. 2 is a connection diagram of the phase changing device of the induction motor according to the present invention.

FIG. 2 shows a diagram of wiring connections. The stator windings 11 for respective phases are at one side ends ($U_1$, $V_1$, $W_1$) connected to the respective phases A, B, C of the three-phase power supply source through power switching means $S_o$ and are at the other-side-ends ($X_1$, $Y_1$, $Z_1$) connected to one-side ends ($Y_2$, $Z_2$, $X_2$) of the stator windings 10. The other-side ends ($U_2$, $V_2$, $W_2$) of the windings 10 are connected to the above one-side ends ($U_1$, $V_1$, $W_1$) of the windings 11 so as to form a series Δ-connection with respect to the power supply source. The first short-circuiting switch $S_1$ is connected between the terminal $X_1$ of the windings 11 and the terminal $Z_2$ of the windings 10 while the second short-circuiting switch $S_2$ is connected between the terminal $Y_1$ of the windings 11 and the terminal $X_2$ of the windings 10.

Hereinafter the relevant operation is explained.

Figure 3:
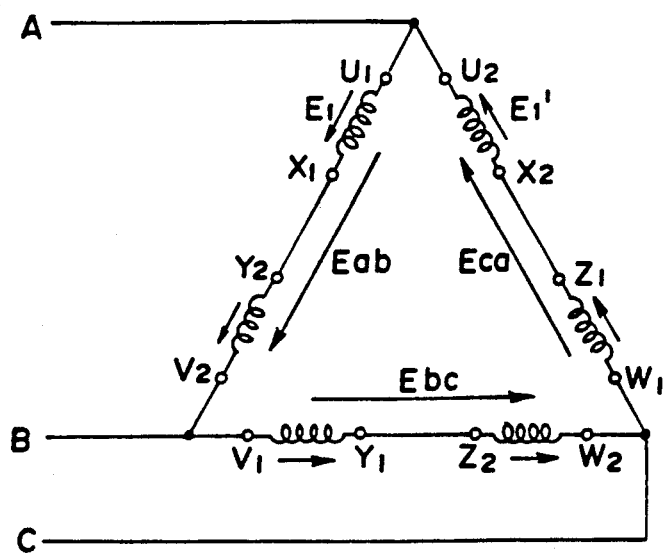
FIG. 3 shows a delta-connection producing a predetermined phase difference.

First, when the power source switch $S_o$ is closed, the stator windings 11 and the stator windings 10 form a series Δ-connection which produces the phase difference of 60°, with respect to the three-phase power sources A, B, C as shown in FIG. 3. The respective stator windings 11, 10 are so connected with each other that there is produced the phase difference of 60° between voltage $E_1$ across the coil $U_1$-$X_1$ of the stator windings 11 and that $E_1'$ across the coil $U_2$-$X_2$ of the stator windings 10. Each of the voltages $E_1$, $E_1'$ appearing across each coil is one half of the line-to-line voltage of the power supply voltage.

Figure 4A:
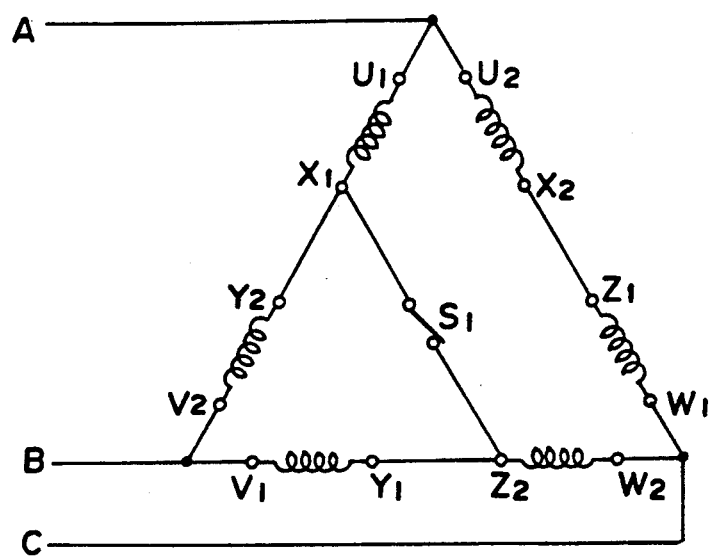
FIGS. 4(a) and 4(b) show wiring diagrams of unbalanced connection where one short-circuiting switch is closed.
Figure 4B:
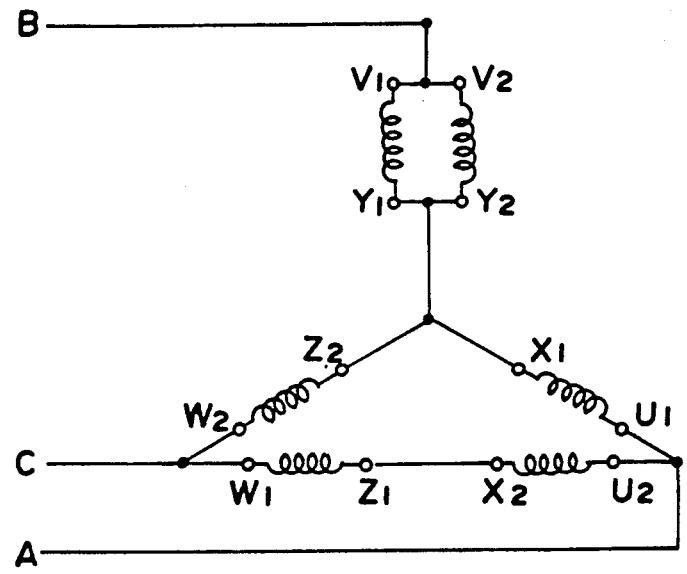

Next, when the first short-circuiting switch $S_1$ is closed so that the terminal $X_1$ of the windings 11 and the terminal $Z_2$ of the windings 10 are short-circuited, the connection of the respective stator windings changes to the unbalanced state as shown in FIG. 4. The coil $V_2$-$Y_2$ and the coil $V_1$-$Y_1$ are connected in parallel. The voltages appearing across the coils except for the coils connected between the lines C, A of the power supply source go up, and accordingly the torque increases. The resulting torque characteristic curve is intermediate between the curves obtained under the series Δ-connection and the parallel Y-connection over a certain speed. The increase in the voltage in this case is similar to the increase in the voltage under the parallel Y-connection hereinafter explained. FIG. 4(b) is a wiring diagram viewed from the first switch $S_1$ as the center, for the sake of simplification of the wiring diagram shown in FIG. 4(a).

Figure 5:
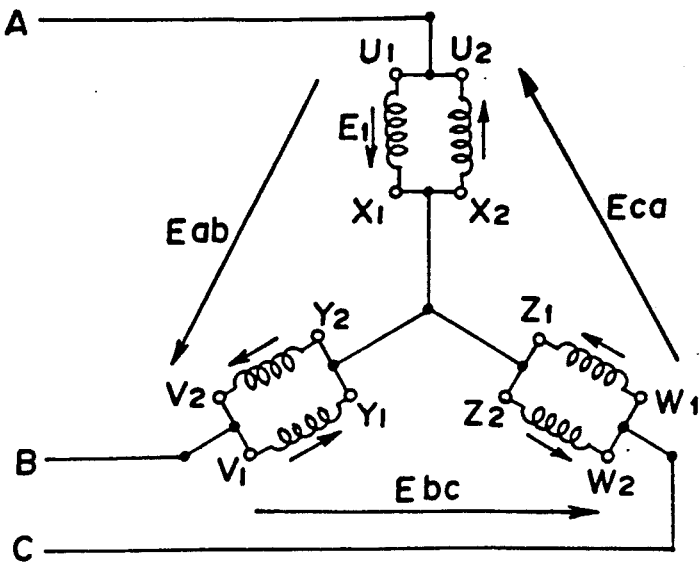
FIG. 5 shows a parallel Y-connection producing the phase difference of 0°.

Next, when the second short-circuiting switch $S_2$ is also closed while the first-switch $S_1$ is retained in its closed state, the wiring connection of the stator windings becomes the parallel Y-connection producing the phase difference of 0° as already explained above. The wiring connection under this state is shown in FIG. 5.

The magnitude of the voltage $E_1$ appearing across the coil $U_1$-$X_1$ at the above state is $2/\sqrt{3}=1.15$ times larger as compared with that appearing at the connection under the series $\Delta$-connection. This increase in the voltage is within the range of tolerance and does not present any problems in the operation of the motor. It is rather an advantage since the torque is increased by such increase in the voltage.

Figure 6A:
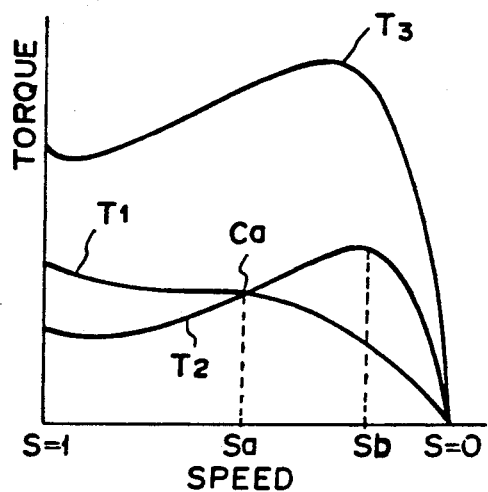
FIGS. 6(a) and 6(b) shows typical characteristic curves obtained by the motor having the resistive members.
Figure 6B:
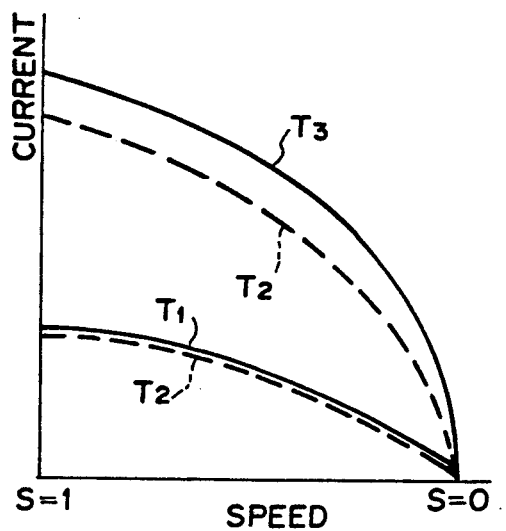
Figure 7A:
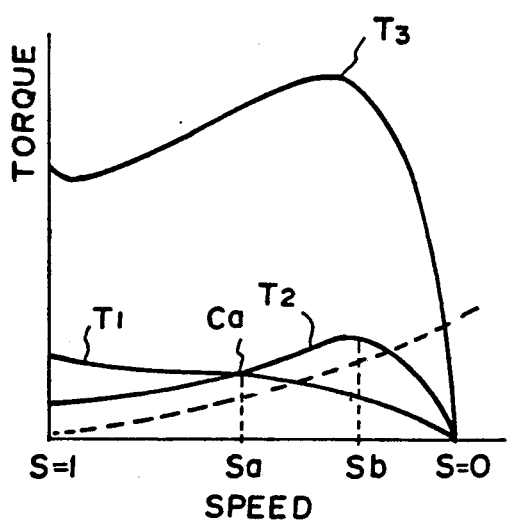
FIGS. 7(a) and 7(b) shows typical characteristic curves obtained by the motor having no resistive members.
Figure 7B:
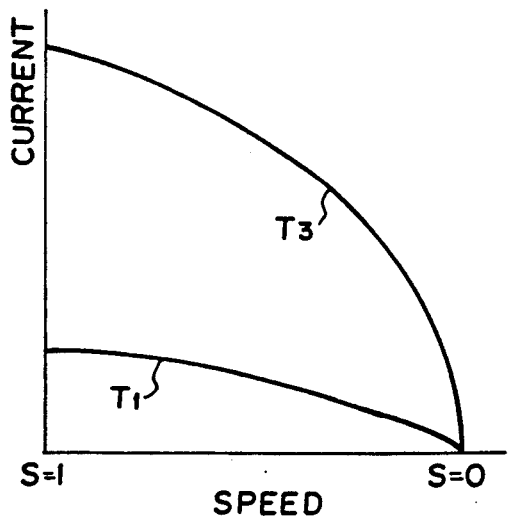

As explained in the forgoing, it is possible to achieve three different torque characteristics $T_1$, $T_2$ and $T_3$, suitable for starting operation, intermediate operation and steady-state or normal operation, respectively, by the switching of the two short-circuiting switches, namely, the first-switch $S_1$ and the second-switch $S_2$. FIGS. 6 and 7 show typical characteristic curves obtained by the motor of the present invention. FIGS. 6(a) and 6(b) respectively show typical torque-speed curves and current-speed curves of the motor having the resistive members 9. As the vector difference current flows in the resistive members 9 at the starting where the phase difference is large, the motor can output comparatively higher torque despite the low current. It is possible to efficiently increase the rotational speed of the motor by changing the connection of the stator windings to the unbalanced state at the slip Sa corresponding to the intersection of torque characteristic curves $T_1$ and $T_2$ and further changing it to the connection of the phase difference of 0° at the slip Sb corresponding to the peak point of the torque characteristic curve $T_2$ under the unbalanced state. FIGS. 7(a) and 7(b) show respectively typical torque-speed and current-speed curves of the motor having no resistive members 9 .... Since the resistive members 9 ... are not provided, the torque generated at the starting under the predetermined phase difference and the unbalanced state becomes lower as compared with that generated in the case where the resistive members 9 ... are provided. It is needless to say that the characteristic curves are changeable in accordance with the resistance value of the conductive members 6 ..., that of the resistive members 9 ... or the number of the resistive members 9 ....

At the phase difference of 0° where the first and second switches $S_1$, $S_2$ are both closed, the other side ends ($X_1$, $Y_1$, $Z_1$) of the stator windings 11 and the one side ends ($X_2$, $Y_2$, $V_2$) of the stator windings 10 are in their short-circuited state so it can be understood that there will be no possibility of occurrence of any electrical trouble even if they are short-circuited by any other causes.

Further, since the first- and second-switches $S_1$, $S_2$ for effecting the necessary phase changing are for short-circuiting between the series connection nodes of the windings of the series delta connection and there is no switching transitory interruption in the load currents, it is possible to minimize the contact capacity of each of the switches, thereby to scale down the phase changing system comprising the first- and second-switches $S_1$, $S_2$.

As will be understood from FIG. 2, when the phase changing system having the switches $S_1$, $S_2$ are installed at the motor side, only three lines from the power source to the motor are sufficient and, unlike the case as seen in an ordinary motor of a large size, it is possible to provide a motor which operates at a high driving torque from a low speed range up to a high speed range without the need of attending to a complicated wiring process for Y-$\Delta$ starting of the motor.

Figure 8:
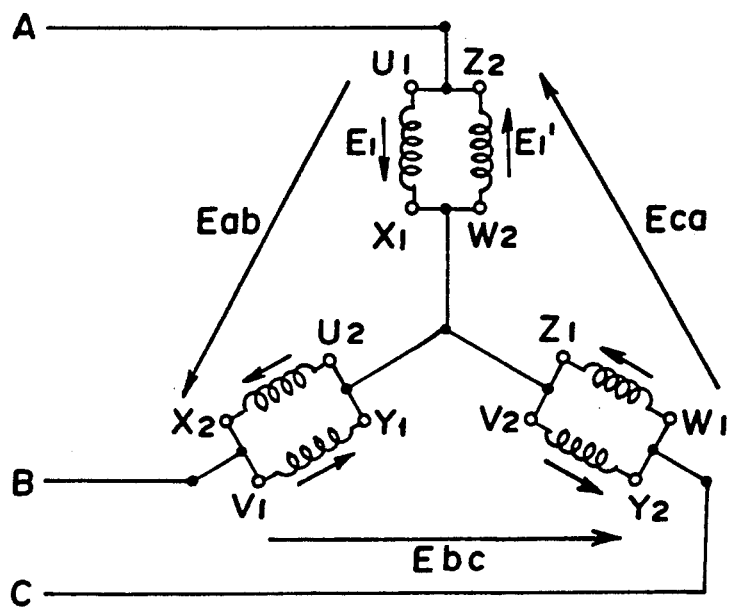
FIG. 8 shows a parallel Y-connection producing a predetermined phase difference.
Figure 9:
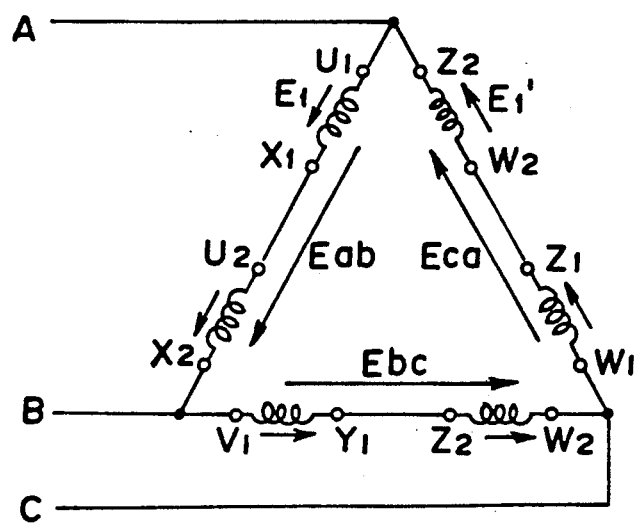
FIG. 9 shows a series Δ-connection producing the phase difference of 0°.

Further, the motor according to the present invention may have the following arrangement. That is, it is possible to make an arrangement by which sequential switching may be effected and in which the wiring connection at the motor starting may be a parallel Y-connection for causing a predetermined phase difference, be changed once to an unbalanced connection at an intermediate time period after the starting of the motor, and be changed finally to a series delta-connection at the steady-state operation for causing the phase difference of 0° or a predetermined phase difference which is 60° less than the predetermined phase difference at the starting. FIG. 8 shows the state of the motor starting under which both the short-circuiting switches $S_1$, $S_2$ are switched on thereby forming a parallel Y connection and FIG. 9 shows the state of wiring connection during the steady-state or normal operation under which the short-circuiting switches S1, S2 are both opened thereby forming a series $\Delta$-connection.

Figure 10:
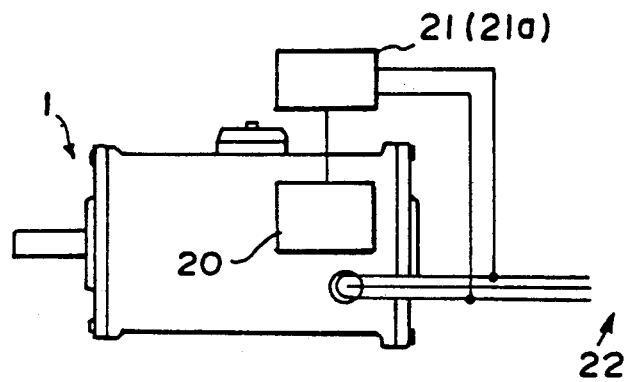
FIG. 10 is a connection diagram of the control device having a timer means to the phase changing system.
Figure 11:
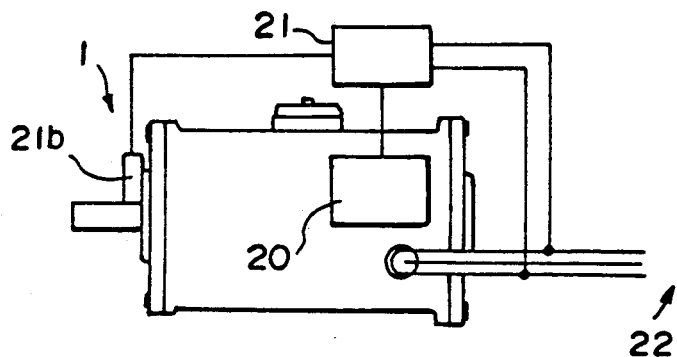
FIG. 11 is a connection diagram of the control device having a speed detecting means to the phase changing system.
Figure 12:
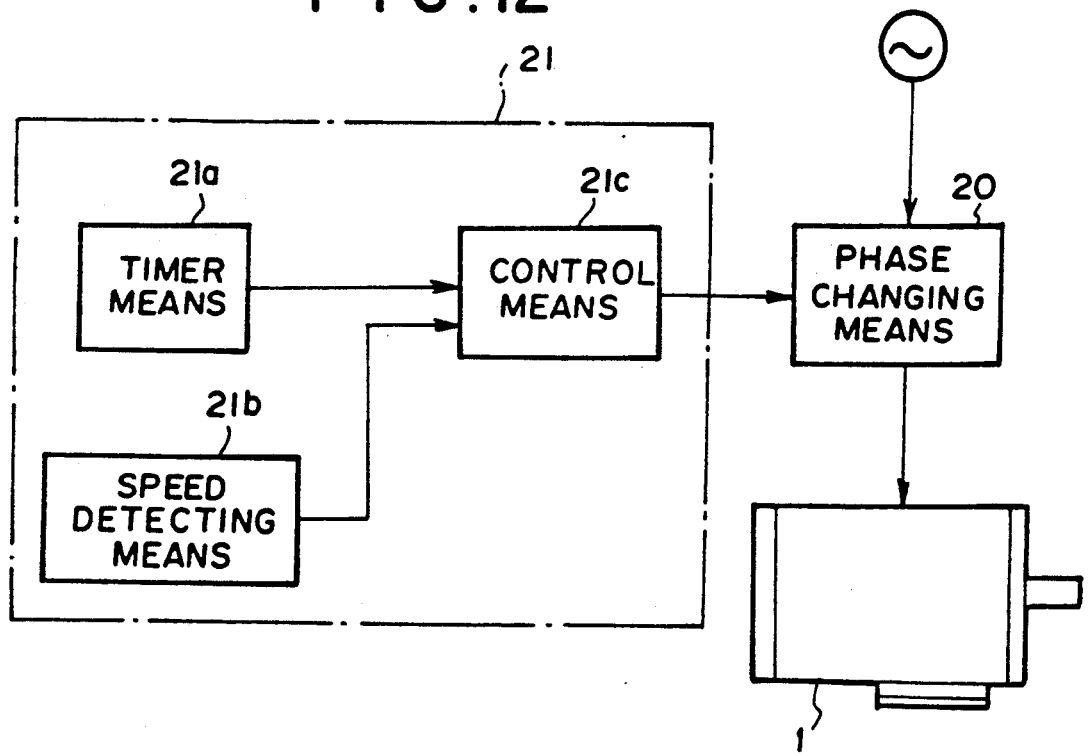
FIG. 12 is a connection diagram of the control device having both the time means and the speed detecting means to the phase changing means.

Now, the method of controlling the phase changing system is explained with reference to FIGS. 10 through 12. In the configuration shown in FIG. 10, the induction motor 1 is connected to a three-phase power source 22 having switching means. Also, the induction motor is provided with the phase changing system 20 in an unitary manner. To the phase changing system 20 is connected a control device 21 which incorporates a sequential circuit having a timer means 21a. As for the arrangement shown in FIG. 11, the induction motor 1 is connected to a three-phase power source 22 equipped with switching means. The induction motor is provided with the phase changing system 20 also in a unitary manner and this phase changing system 20 is connected with a control device 21 which is composed of, for example, a hard logic circuit. A signal from a speed detecting means 21b for detecting the rotational speed of the motor is inputted to the control device 21. As shown in FIG. 12, the control device 21 may have both the timer means 21a and the speed detecting means 21b and, in this case, the phase changing means 20 is controlled through a control means 21c.

The operation of the device arranged as above is hereinafter explained.

The control device 21 controls the switching of the first and second short-circuiting switches $S_1$, $S_2$ of the phase changing system 20 based on the time limits set by the timer means 21a or on the signals sent from the speed detecting means 21b.

With the control device 21 having the timer means 21a, since the normal Y-$\Delta$ starting is switched in an average time of 10 seconds, the phase difference may be 60° at the starting and the shifting up to the normal operation at the phase difference of 0° may be carried out, for example, from 60° for the starting and, subsequently, the time for shifting to the unbalanced state may be set for 4-5 seconds after the starting and the time for shifting from the unbalanced state to the phase difference of 0° may be set for 4-5 seconds after the unbalanced state having taken place so that, by means of the phase changing system 20, the phase differences are shifted in three steps sequentially from 60° to 0°. Of course, the time limits set by the timer means 21a may be changed according to the load characteristics of the load connected to the motor.

The control device 21 having the speed detecting means 21b may be one which is a simple logic circuit or one in which a microprocessor is installed depending on the necessity involved. This control device 21 adopts the up-to-date technology and includes a circuit for receiving a signal from the speed detecting means 21b and for effecting any necessary conversion of such signal, a circuit for comparing the converted signal with a predetermined reference value, a circuit for memorizing the predetermined reference value, and a signal output circuit for outputting any necessary control signal based on the comparison between the converted signal and the predetermined reference value. The control signal from the signal output circuit causes the phase changing system 20 to produce the necessary phase differences in a sequential manner.

Time limits and the predetermined reference values for the control device 21 are determined by, for example, the load characteristics and the outputs of the motor. Each of the control devices is one for simply controlling the switching of the two short-circuiting switches so that, as a control device for the induction motor having three-step phase differences, it is possible for them to be incorporated as unitary members in the phase changing system having the connection changing switches.

Figure 13:
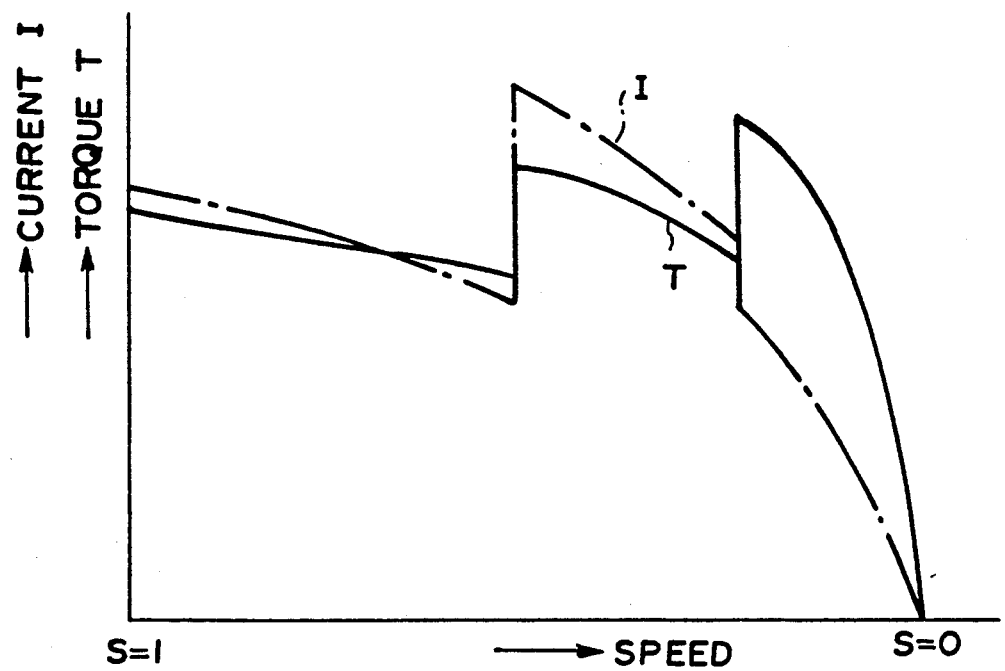
FIG. 13 shows total torque-speed and current-speed characteristic curves obtained by the induction motor having the phase changing system according to the invention.
Figure 14:
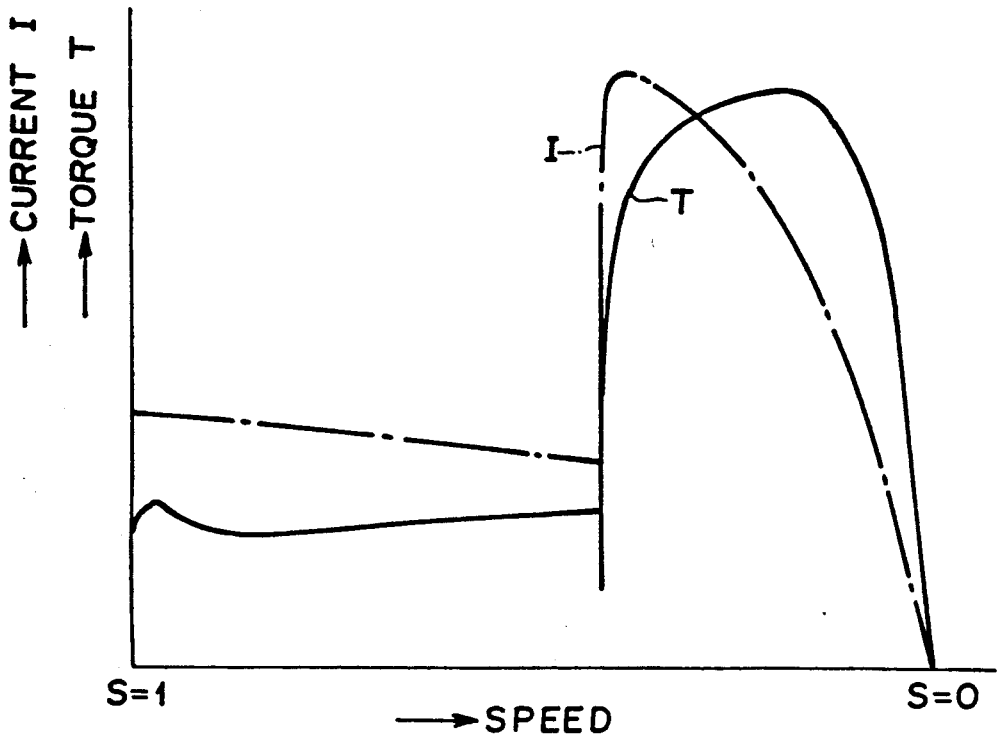
FIG. 14 shows torque-speed and current-speed characteristic curves obtained by the conventional Y-Δ changing system.

The overall torque characteristics obtained by means of the control device for controlling the phase changing system as explained above are as shown in FIG. 13 from which it is appreciated that the range of torque variations and the operating current, especially, the starting current can be kept smaller as compared with that in the conventional Y-Δ-connection changing (refer to FIG. 14).

Further, although the embodiments of the invention so far explained are focused on the three step phase differences, it is of course possible to use, depending on the load characteristics, a means by which all the series connection nodes of the stator windings are simultaneously short-circuited through the short-circuiting switches. Unlike with the Y-Δ-changing system, since there is no interruption of the load current at the switching and also since there are a plurality of stators, the phase changing can be effected simultaneously and the torque characteristics can be changed efficiently from those of the starting to those of the steady-state operation. The device for effecting this switching is simple and not costly and can achieve the same or similar advantages as in the other embodiments explained above.

As explained above, the present invention has made it possible for the induction motor with a plurality of stators to have the phase differences set in three steps by the simple phase changing system and, moreover, such phase differences are for three different states, namely, for starting, for intermediate speed operation and for normal or steady-state operation. Especially, expect for the situation where the motor needs to be speed-variable, the motor according to the present invention is suited in meeting the demands for improving the starting characteristics for, for example, a load having constant load characteristics or declining load characteristics and in meeting the object of decreasing the starting time. Also, it is an advantage that the motor according to the present invention does not require any costly device such as an inverter.

The wiring in the motor allows the phase changing device to have a simple construction with the device being unitarily built-in the motor and with the wiring being a fixed one so that there may be only three lines of wiring for three-phase power source and that, in so far as there is no error in the confirmation of the direction of rotation, anybody can easily carry out the necessary wirings and installation of the motor.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An induction motor comprising:
   a single rotor formed in one-piece having a first and a second rotor core axially mounted on a common axis with an airspace or a non-magnetic portion being provided between said two rotor cores and having on said two rotor cores a plurality of rotor conductive members extending therethrough;
   a first and a second stator disposed side by side and surroundingly facing said respective rotor cores, said first and second stators having a first and a second stator core on which a plurality of polyphase windings are being wound, said plurality of polyphase windings of said first and second stators being interconnected so as to form a series Δ-connection; and
   a phase changing means having short-circuiting switches disposed respectively between series-junction nodes of said respective stator windings of different phases of said first and second stators, for varying the phase difference between the rotational magnetic fields around said first rotor core generated by said first stator and the rotational magnetic fields around said second rotor core generated by said second stator by the operation of said short-circuiting switches.

2. An induction motor according to claim 1, which includes resistive members arranged at said airspace or non-magnetic portion disposed between said two rotor cores and in which said plurality of rotor conductive members are mutually short-circuited by said resistive members.

3. An induction motor according to claim 1, in which said phase changing means comprises at least two short-circuiting switches and, said stator windings of said first and second stators are connected so as to form a parallel Y-connection where there is no phase difference when said two short-circuiting switches are closed.

4. An induction motor according to claim 3, in which said stator windings of said first and second stators are connected so as to form an unbalanced connection where a predetermined phase difference occurs when either one of said two short-circuiting switches is closed.

5. An induction motor according to claim 1, in which said phase changing means comprises at least two short-circuiting switches and, said stator windings of said first and second stators are connected so as to form a parallel Y-connection where a predetermined phase difference is produced when said two short-circuiting switches are closed.

6. An induction motor according to claim 1, which further comprises a control device for effecting the ON/OFF controlling of said short-circuiting switches.

7. An induction motor according to claim 6, in which said control device has a timer means for controlling the timing for closing or opening of said short-circuiting switches.

8. An induction motor according to claim 6, in which said control device has a speed detecting means for detecting the rotational speed of the motor and for controlling the timing for closing or opening of said short-circuiting switches.

9. An induction motor according to claim 1, in which said phase changing means is mounted on a machine frame of said motor.

10. An induction motor according to claim 6, in which said control device is incorporated as a unitary member in said phase changing means.

* * * * *

UNITED STATES PATENT AND TRADEMARK OFFICE
CERTIFICATE OF CORRECTION

PATENT NO. : 5,068,559

DATED : November 26, 1991

INVENTOR(S) : Toshihiko SATAKE et al.

It is certified that error appears in the above-identified patent and that said Letters Patent is hereby corrected as shown below:

In the Claims, column 10, claim 1, line 29, please delete "being".

Signed and Sealed this

Twenty-fifth Day of May, 1993

Attest:

MICHAEL K. KIRK

Attesting Officer

Acting Commissioner of Patents and Trademarks